(12) United States Patent
Fang et al.

(10) Patent No.: US 9,195,826 B1
(45) Date of Patent: Nov. 24, 2015

(54) GRAPH-BASED METHOD TO DETECT MALWARE COMMAND-AND-CONTROL INFRASTRUCTURE

(71) Applicant: EMC Corporation, Hopkinton, MA (US)

(72) Inventors: ChunSheng Fang, San Mateo, CA (US); Derek Lin, San Mateo, CA (US); Joseph A. Zadeh, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 36 days.

(21) Appl. No.: 13/906,200

(22) Filed: May 30, 2013

(51) Int. Cl.
*G06F 21/00* (2013.01)
*G06F 21/56* (2013.01)

(52) U.S. Cl.
CPC ........................................ *G06F 21/56* (2013.01)

(58) Field of Classification Search
CPC ............................................................ G06F 21/56
USPC .................................................................. 726/23
See application file for complete search history.

(56) References Cited

U.S. PATENT DOCUMENTS

| | | | |
|---|---|---|---|
| 5,278,901 A * | 1/1994 | Shieh et al. .................... 726/22 |
| 6,282,546 B1 * | 8/2001 | Gleichauf et al. .............. 726/25 |
| 6,301,668 B1 * | 10/2001 | Gleichauf et al. .............. 726/25 |
| 6,324,656 B1 * | 11/2001 | Gleichauf et al. .............. 714/37 |
| 6,415,321 B1 * | 7/2002 | Gleichauf et al. ............ 709/224 |
| 6,484,315 B1 * | 11/2002 | Ziese ............................. 717/173 |
| 6,487,666 B1 * | 11/2002 | Shanklin et al. ................ 726/23 |
| 6,499,107 B1 * | 12/2002 | Gleichauf et al. .............. 726/23 |
| 6,567,917 B1 * | 5/2003 | Ziese ............................. 713/187 |
| 6,578,147 B1 * | 6/2003 | Shanklin et al. ................ 726/22 |
| 6,597,957 B1 * | 7/2003 | Beakley ............................ 700/7 |
| 6,609,205 B1 * | 8/2003 | Bernhard et al. ............... 726/22 |
| 6,704,874 B1 * | 3/2004 | Porras et al. .................... 726/22 |
| 6,708,212 B2 * | 3/2004 | Porras et al. .................. 709/224 |
| 6,711,615 B2 * | 3/2004 | Porras et al. .................. 709/224 |
| 6,775,657 B1 * | 8/2004 | Baker ............................. 706/45 |
| 6,785,821 B1 * | 8/2004 | Teal ................................ 726/23 |
| 6,792,546 B1 * | 9/2004 | Shanklin et al. ................ 726/23 |
| 6,816,973 B1 * | 11/2004 | Gleichauf et al. .............. 726/13 |
| 6,880,087 B1 * | 4/2005 | Carter ............................. 726/23 |
| 6,954,775 B1 * | 10/2005 | Shanklin et al. .............. 718/105 |

(Continued)

OTHER PUBLICATIONS

Djidjev et al, "Graph-Based Traffic Analysis for Network Intrusion Detection", Los Alamos National Laboratory Associate Directorate for Theory, Simulation, and Computation (ADTSC) LA-UR 10-01992, 2010, pp. 84-85.

(Continued)

*Primary Examiner* — David Garcia Cervetti
(74) *Attorney, Agent, or Firm* — Van Pelt, Yi & James LLP

(57) ABSTRACT

Potentially infected internal device(s) and potential malware command and control device(s) are identified by generating a bipartite graph that includes internal device(s) inside a network and destination(s) outside the network which communicate over a period of time. The bipartite graph is reduced to obtain a reduced bipartite graph, including by eliminating those connections that include a whitelisted internal device and those connections that include a whitelisted destination. From the reduced graph, a cluster of potentially infected internal device(s) and potential malware command and control device(s) are identified based at least in part on (1) the cluster's degree of isolation from other clusters and (2) an isolation threshold.

20 Claims, 14 Drawing Sheets

(56) References Cited

U.S. PATENT DOCUMENTS

| | | | |
|---|---|---|---|
| 6,968,377 B1 * | 11/2005 | Gleichauf et al. | 709/224 |
| 7,047,423 B1 * | 5/2006 | Maloney et al. | 726/2 |
| 7,130,466 B2 * | 10/2006 | Seeber | 382/218 |
| 7,140,041 B2 * | 11/2006 | Jeffries et al. | 726/24 |
| 7,146,305 B2 | 12/2006 | van der Made | 703/22 |
| 7,162,649 B1 * | 1/2007 | Ide et al. | 713/165 |
| 7,178,166 B1 * | 2/2007 | Taylor et al. | 726/25 |
| 7,237,264 B1 * | 6/2007 | Graham et al. | 726/23 |
| 7,340,776 B2 * | 3/2008 | Zobel et al. | 726/24 |
| 7,353,511 B1 * | 4/2008 | Ziese | 717/178 |
| 7,370,360 B2 * | 5/2008 | van der Made | 726/24 |
| 7,403,980 B2 * | 7/2008 | Stringer-Calvert et al. | 709/220 |
| 7,409,721 B2 * | 8/2008 | Hernacki et al. | 726/25 |
| 7,412,724 B2 * | 8/2008 | Baum-Waidner et al. | 726/23 |
| 7,437,762 B2 * | 10/2008 | Dacier et al. | 726/25 |
| 7,454,790 B2 * | 11/2008 | Potok | 726/23 |
| 7,480,712 B2 * | 1/2009 | Moy | 709/223 |
| 7,499,590 B2 * | 3/2009 | Seeber | 382/218 |
| 7,530,105 B2 * | 5/2009 | Gilbert et al. | 726/22 |
| 7,565,549 B2 * | 7/2009 | Satterlee et al. | 713/187 |
| 7,574,740 B1 * | 8/2009 | Kennis | 726/22 |
| 7,594,260 B2 * | 9/2009 | Porras et al. | 726/13 |
| 7,624,448 B2 * | 11/2009 | Coffman | 726/23 |
| 7,634,800 B2 * | 12/2009 | Ide et al. | 726/3 |
| 7,873,046 B1 | 1/2011 | Seshadri | |
| 7,917,393 B2 | 3/2011 | Valdes et al. | |
| 8,578,497 B2 * | 11/2013 | Antonakakis et al. | 726/24 |
| 8,826,438 B2 * | 9/2014 | Perdisci et al. | 726/24 |
| 9,038,178 B1 | 5/2015 | Lin | |
| 2005/0027981 A1 * | 2/2005 | Baum-Waidner et al. | 713/164 |
| 2006/0010252 A1 | 1/2006 | Miltonberger et al. | |
| 2006/0028996 A1 | 2/2006 | Huegen et al. | |
| 2006/0069912 A1 * | 3/2006 | Zheng et al. | 713/151 |
| 2007/0209074 A1 * | 9/2007 | Coffman | 726/23 |
| 2007/0209075 A1 * | 9/2007 | Coffman | 726/23 |
| 2007/0226796 A1 * | 9/2007 | Gilbert et al. | 726/22 |
| 2008/0046393 A1 * | 2/2008 | Jajodia et al. | 706/50 |
| 2008/0086551 A1 * | 4/2008 | Moy | 709/223 |
| 2009/0126003 A1 | 5/2009 | Touboul | |
| 2009/0260083 A1 | 10/2009 | Szeto et al. | |
| 2012/0173710 A1 | 7/2012 | Rodriguez | |

OTHER PUBLICATIONS

Staniford-Chen et al, "GrIDS—A Graph Based Intrusion Detection System for Large Networks", 1996.

* cited by examiner

550

| Internal Device (500) | Destination (502) | Timestamp (504) | Port # (506) | Amount of Data Exchanged (508) | Duration of Connection (510) | |
|---|---|---|---|---|---|---|
| 10.10.10.1 | 10.10.10.6 | Apr-1-13, 16:01 GMT | 443 | 1.2 MB | Not Available | |
| 10.10.10.2 | 10.10.10.7 | Apr-5-13, 16:01 GMT | 80 | Not Available | Not Available | |
| 10.10.10.1 | 10.10.10.8 | Apr-15-13, 12:17 GMT | 443 | Not Available | 1 H, 37 M | 520a |
| 10.10.10.2 | 10.10.10.6 | Apr-17-13, 09:46 GMT | 443 | 0.7 MB | Not Available | 522 |
| 10.10.10.1 | 10.10.10.8 | Apr-19-13, 22:34 GMT | 443 | Not Available | 4 H, 05 M | 520b |

⇓

560

| Internal Device (500) | Destination (502) | Timestamp (504) | Port # (506) | Amount of Data Exchanged (508) | Duration of Connection (510) | |
|---|---|---|---|---|---|---|
| 10.10.10.1 | 10.10.10.8 | Apr-15-13, 12:17 GMT | 443 | Not Available | 1 H, 37 M | 520a |
| 10.10.10.2 | 10.10.10.6 | Apr-17-13, 09:46 GMT | 443 | 0.7 MB | Not Available | 522 |
| 10.10.10.1 | 10.10.10.8 | Apr-19-13, 22:34 GMT | 443 | Not Available | 4 H, 05 M | 520b |

FIG. 5A

GRAPH-BASED METHOD TO DETECT MALWARE COMMAND-AND-CONTROL INFRASTRUCTURE

BACKGROUND OF THE INVENTION

Hackers who write malware programs are often aware of malware detection techniques and design their malware programs with such techniques in mind. One protection technique is to use a blacklist in which known malware command and control infrastructure (e.g., from which malware commands are downloaded and/or to which private information is uploaded) is recorded. A company may use a blacklist to prevent internal devices (e.g., within a company's firewall or intranet) from communicating with external devices on the blacklist.

To avoid being identified and added to the blacklist, hackers may design their malware systems so that an infected device communicates with multiple malware command and control devices at any given time. This enables a covert bi-directional communication channel to the malware command and control infrastructure such that individual communication streams do not stand out statistically from legitimate communication streams.

Another detection avoidance technique is to change the set of malware command and control devices communicated with over time. Even if some or all of the malware command and control infrastructure is detected and added to the blacklist, the blacklist will only be effective until the next change. New malware detection techniques that can assist in detecting malware systems, that can detect multiple mobile command and control operators, and/or change the set of malware command and control devices over time would be desirable.

BRIEF DESCRIPTION OF THE DRAWINGS

Various embodiments of the invention are disclosed in the following detailed description and the accompanying drawings.

FIG. 5A is a diagram showing an embodiment of semi-structured data received from a log aggregator.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
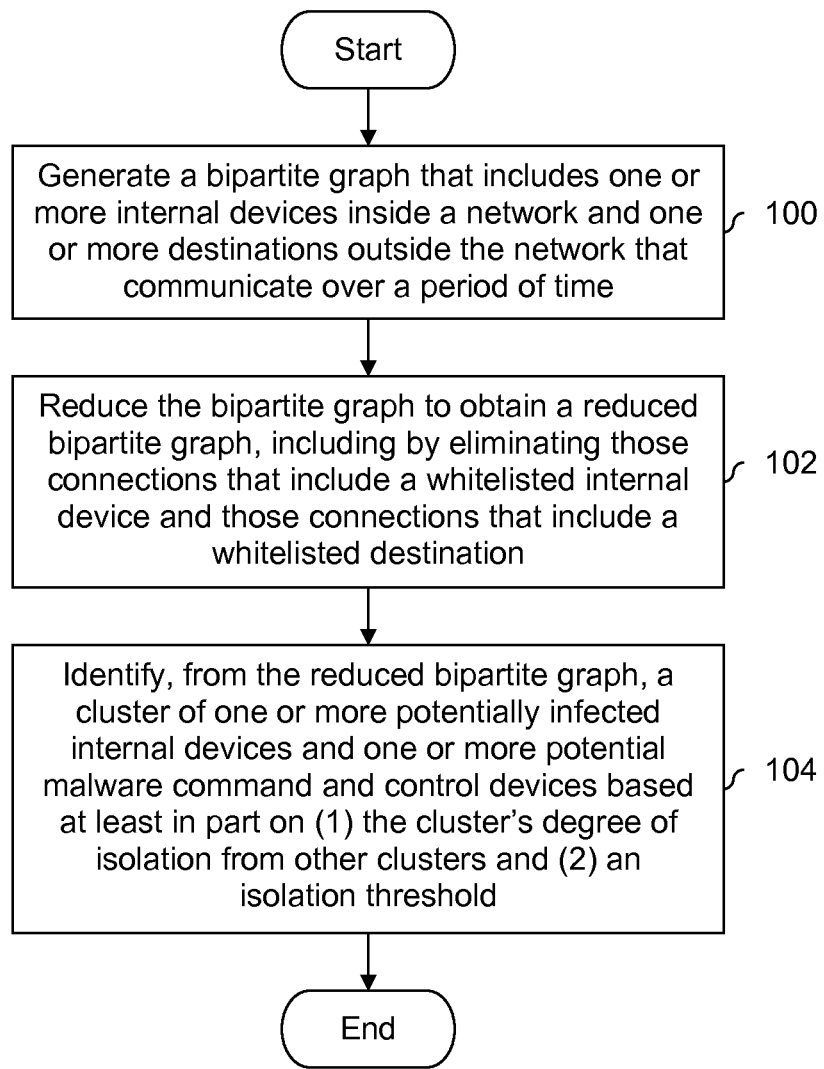
FIG. 1 is a flowchart illustrating an embodiment of a process for identifying potentially infected internal devices and potential malware command and control devices.

FIG. 1 is a flowchart illustrating an embodiment of a process for identifying potentially infected internal devices and potential malware command and control devices. At 100, a bipartite graph of one or more internal devices inside a network and one or more destinations outside the network that communicate over a period of time is generated. A bipartite graph has two categories or types of devices and an imaginary dividing line between the two categories may (at least conceptually) correspond to a network boundary that divides internal and external devices (e.g., a company or business's firewall). In various embodiments, a bipartite graph (also referred to herein as a graph) may be stored or expressed in a variety of ways. For example, a graph may be stored or expressed as a list of pairs, where each connection between an internal device and a destination is expressed as one of the pairs in the list. Alternatively, a graph may be expressed as linked or associated objects, where a link or association exists if a given internal device and a given destination have communicated over the period of time of interest.

In some embodiments, an internal device is an internet facing appliance or a perimeter device that has direct access to devices outside of the network. For example, in some embodiments an internal device that can only communicate with other internal devices in a network but not directly with external devices is excluded from the set generated at 100.

In some embodiments, the set of pairs generated at 100 uses information from a device that aggregates or collects communication logs or records from other devices. Such a device is hereinafter referred to as a log aggregator. Some examples of a log aggregator include a security information management (SIM) device, a security information and event management (SIEM) device, and a security event manager (SEM). Various embodiments of step 100 are described in further detail below.

In some embodiments, simulations are performed to determine an amount of time over which to generate a set of pairs. For example, depending upon the type of cluster desired and/or the isolation threshold at step 104, different lengths of time may produce better or desirable results.

At 102, the bipartite graph is reduced to obtain a reduced bipartite graph, including by eliminating those connections that include a whitelisted internal device and those connections that include a whitelisted destination. In some embodiments, a whitelisted internal device is one which legitimately or as part of its responsibilities within the system communicates with a large number of external devices. Some examples of whitelisted internal devices include: a name server (e.g., for Domain Name System (DNS)), a domain controller (e.g., Microsoft's Active Directory), or an authentication server (e.g., Kerberos).

In some embodiments, a third-party entity is consulted to establish which destinations are whitelisted destinations (e.g., receiving reputation information for one or more destinations). For example, an Internet reputation system may be communicated with to determine which websites, IP addresses, and so on are reputable or trustworthy (e.g., by sending a query with the destination in question to the Internet reputation system and receiving a response, or by downloading a list of reputable destinations). In some embodiments, the device performing the process of FIG. 1 establishes for itself what destinations are whitelisted destinations. For example, it may do this based on how long internal users within the network have been communicating with a destination, how many internal users are communicating with that destination, and so on. More detailed examples of step 102 are described in further detail below.

At 104, from the reduced bipartite graph, a cluster of one or more potentially infected internal devices and one or more potential malware command and control devices are identified based at least in part on (1) the cluster's degree of isolation from other clusters and (2) an isolation threshold. Various examples of this are described in further detail below.

In some embodiments, in addition to a cluster's degree of isolation from other clusters and an isolation threshold, one or more other cluster specifications are specified. Some examples include a minimum number of internal devices (e.g., an identified cluster has at least the specified minimum number of nodes on the left side of the graph), a maximum number of internal devices (e.g., an identified cluster can have no more than the specified maximum number of nodes on the left side of the graph), a minimum number of external devices (e.g., an identified cluster must have at least the specified minimum number of nodes on the right side of the graph), and a maximum number of external devices (e.g., an identified cluster can have no more than the specified maximum number of external devices on the right side of the graph). In some embodiments, a cluster specification specifies a type of cluster (e.g., one-to-one, one-to-many, many-to-one, or many-to-many).

In some embodiments, the potentially infected internal devices and potential malware command and control devices identified using the process of FIG. 1 are presented to a security expert and/or system administrator for further analysis and/or investigation. Such a person may make the final decision as to whether an internal device is in fact infected with malware and/or if an external device is in fact a malware command and control device.

In some such embodiments, to ensure that the subsequent investigation is a manageable task, the number of potentially infected internal devices and/or potential malware command and control devices that are identified by the process of FIG. 1 is limited to a number which can be reasonably investigated so as to be useful (e.g., a limit of 5 total devices, 10 total devices, 20 total devices, etc.). For example, if hundreds or thousands of devices (e.g., potentially infected internal devices, potential malware command and control devices, or total number of devices) were identified by the process, a system administrator may not be able to go through the list quickly enough to take action (e.g., shut down the infected internal device and/or blacklist the malware command and control device) quickly enough to be useful. As such, in some embodiments, the process of FIG. 1 may be adjusted or configured to output a desired number of identified devices so that the system administrator is able to evaluate the list and take effective action in a reasonable amount of time.

Figure 2A:
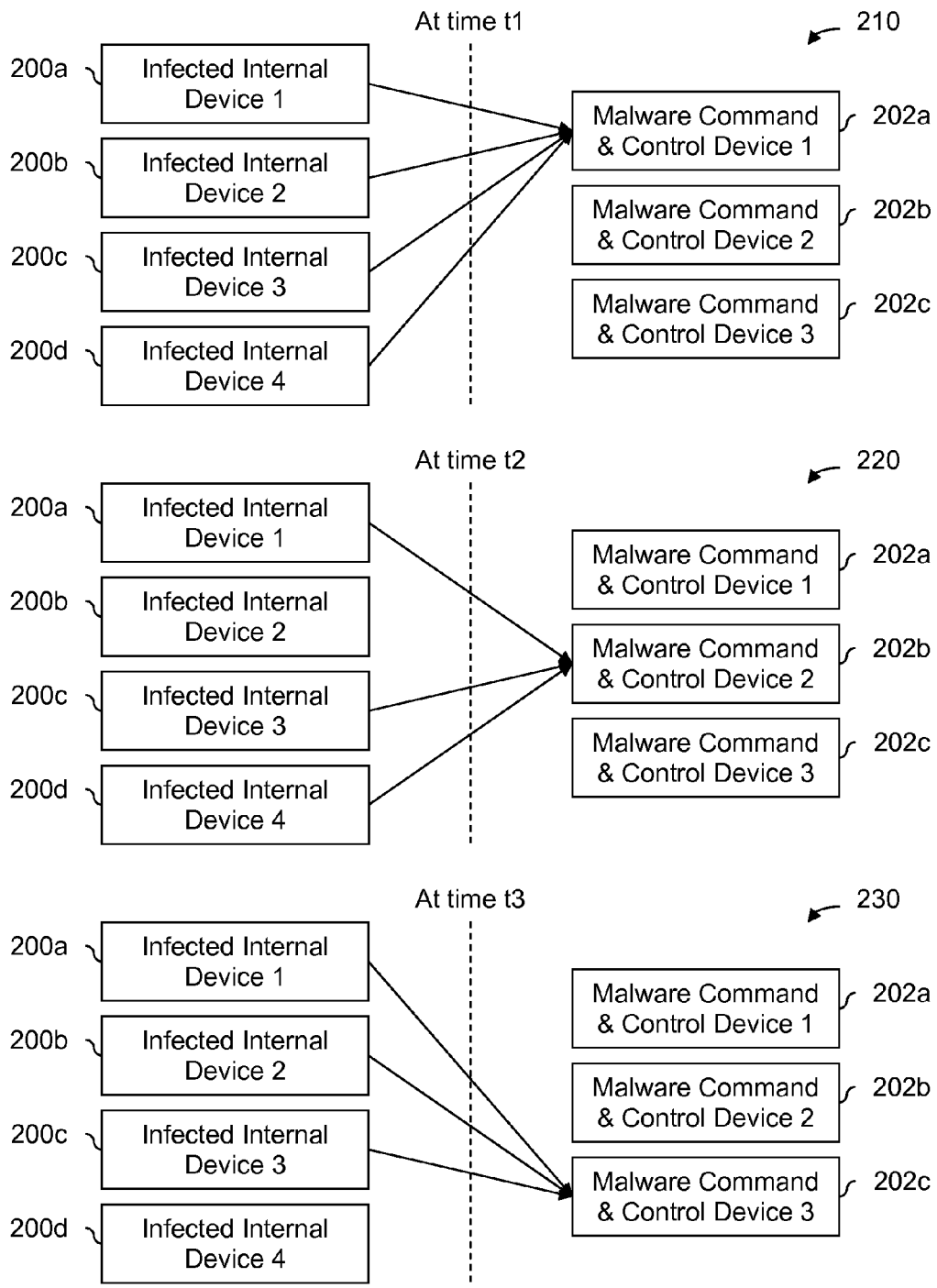
FIG. 2A is a diagram showing an embodiment of communication between infected internal devices and malware command and control devices at three points in time.

FIG. 2A is a diagram showing an embodiment of communication between infected internal devices and malware command and control devices at three points in time. In this example, a technique by which malware systems attempt to evade detection is shown. Although some other detection techniques may not be able to detect the infected internal devices and/or the malware command and control devices shown, the process shown in FIG. 1 is able to detect them; this is explained in further detail below.

In this example, there are four internal devices (200a-200d) which are infected with malware. A network boundary (e.g., protected by a firewall) is shown with a dashed line and so devices to the left of the dashed line are internal devices and devices to the right of the dashed line are external devices. On the left side of the network boundary, the malware causes some subset of infected internal devices 200a-200d to communicate with the malware command and control infrastructure (e.g., which includes malware command and control devices 202a-202c). At time t1 in diagram 210, all of infected internal devices 200a-200d have been instructed by the malware to communicate with the malware command and control infrastructure. Examples of information exchanged with the malware command and control infrastructure include downloaded malware commands and uploaded stolen or snooped information.

On the right side of the network boundary, there are three malware command and control devices (202a-202c), one of which at any given time is the active malware command and control device being communicated with. At time t1 in diagram 210, the malware command and control device being communicated with is the first malware command and control device (202a).

Diagram 220 shows the same system later at time t2. At that point in time, the first infected internal device (200a), the third infected internal device (200c), and the fourth infected internal device (200d) are communicating with the second malware command and control device (202b). The set of infected internal devices that are actively communicating with the malware command and control infrastructure has changed between times t1 and t2, and the malware command and control device being communicated with has also changed between times t1 and t2.

In diagram 230 at time t3, the first infected internal device (200a), the second infected internal device (200b), and the third infected internal device (200c) are communicating with the third malware command and control device (202c). Again, between times t2 and t3, the set of infected internal devices communicating with the malware command and control infrastructure has changed, as well as the malware command and control device being communicated with.

In one example, external devices that are legitimate and popular (e.g., popular email services, popular search engines, or other popular websites) may be eliminated by making them a whitelisted destination at 102 and/or by using a cluster constraint at 104. For example, if $max_{internal}=5$, a popular email service or popular search engine would not be identified using the process of FIG. 1 because more than 5 internal devices would access the email service or search engine website over the period of time being considered. In contrast, if $max_{internal}=5$, the cluster shown in FIG. 2A satisfies that requirement since the number of internal nodes or devices is 4 and would not be eliminated from consideration.

Similarly, external devices that are not popular but that are legitimate may also be eliminated using a whitelisted destination and/or cluster constraint. For example, suppose within a company only one person reads an obscure website about an obscure topic. The obscure website may be identified as a whitelisted destination (e.g., because the user has been accessing that website for a long time and it was determined that that website is harmless) and/or by setting a cluster constraint of $min_{internal}=2$. Since only one internal device accesses that obscure website, a cluster that includes the obscure website would not be considered since it does not meet the specified minimum. In contrast, the cluster shown in FIG. 2A does satisfy the specified cluster constraint of $min_{internal}=2$ since there are four internal devices in the cluster shown, so it would not be eliminated from consideration.

The cluster shown in this example may have characteristics or properties which the process of FIG. 1 searches for. For example, the IP addresses or domain names of malware command and control devices 202a-202c are like disposable cell phones used by criminals: they are used briefly (e.g., to stay ahead of a blacklist) and then are quickly discarded. As a result of the transient or disposable nature of the IP addresses or domain names of malware command and control devices 202a-202c, uninfected internal devices within a network are very unlikely to communicate with malware command and control devices 202a-202c. To continue the disposable cell phone analogy, it is very unlikely that a newly activated disposable cell phone will receive any incoming calls because the number was just activated. As a result of this, once pairs that contain whitelisted internal devices or whitelisted destinations have been eliminated, the cluster shown will appear to be an isolated "island" or cluster of connected nodes because uninfected internal devices are highly unlikely to communicate with malware command and control devices 202a-202c, which makes the cluster shown isolated or island-like. The following figure shows various cluster types and which selected ones may be used (at least in some embodiments) to identify the malware behavior shown in FIG. 2A.

It should be noted that the system shown in FIG. 2A is merely exemplary and in some other embodiments infected devices operate differently than shown herein. For example, infected internal devices may not necessarily have synchronized switching from one malware command and control device to another. Second infected internal device 200b may switch from one malware command and control device to another while first malware command and control device 200a does not switch malware command and control devices. In some embodiments, infected internal devices communicate with malware command and control devices in different orders or sequences. For example, first infected device 200a may go in the order: first malware command and control device (202a), second malware command and control device (202b), and then third malware command and control device (202c), whereas second infected device 200a may go in the order: second malware command and control device (202b), first malware command and control device (202a), and then third malware command and control device (202c).

Figure 2B:
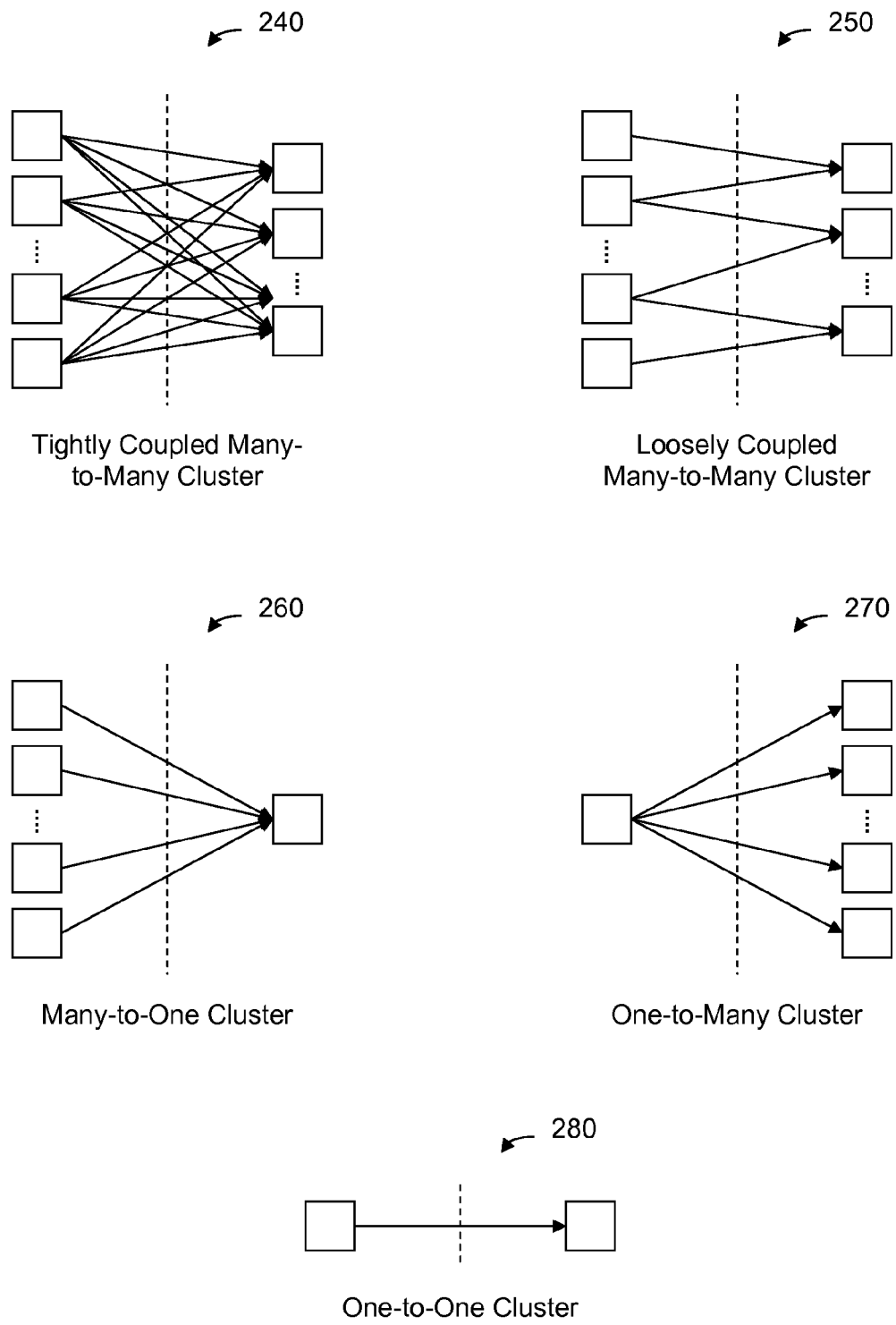
FIG. 2B is a diagram showing an embodiment of various cluster types.

FIG. 2B is a diagram showing an embodiment of various cluster types. In the example shown, diagram 240 shows a tightly coupled many-to-many cluster, diagram 250 shows a loosely coupled many-to-many cluster, diagram 260 shows a many-to-one cluster, diagram 270 shows a one-to-many cluster, and diagram 280 shows a one-to-one cluster.

In some embodiments, identifying a cluster of potentially infected internal devices and potential malware command and control devices at step 104 in FIG. 1 includes identifying a one-to-many cluster (one example of which is shown in diagram 270). Put another way, a one-to-many cluster is an acceptable candidate to be identified at step 104 in FIG. 1 but other types of clusters (in addition to one-to-many clusters) are also permitted to be identified at step 104 in FIG. 1.

In some embodiments, a many-to-many cluster (two examples of which are shown in diagrams 240 and 250) is an acceptable candidate to be identified at step 104 in FIG. 1 (e.g., in addition to any other acceptable cluster types). In some embodiments, tightly coupled many-to-many clusters (one example of which is shown in diagram 240) are preferred over loosely coupled many-to-many clusters (one example of which is shown in diagram 250).

A variety of parameters or measurements may be used to quantify how tightly or loosely coupled a many-to-many cluster is (e.g., along some spectrum between most tightly coupled to most loosely coupled) and select clusters greater than (less than) some threshold. This is also referred to herein as a cluster's degree of internal connectivity. In one example, a cluster's degree of internal connectivity is the percentage of possible connections is determined. For example, if there are N internal devices and M destinations, there are (N×M) total possible connections or pairs. If there are actually C connections between the internal devices and destinations, then the percentage of possible connections is $$\frac{C}{(N \times M)}.$$

In diagram 240, if N=10 and M=9, the percentage is $$\frac{(10 \times 9)}{(10 \times 9)} = 100\%.$$

In diagram 250, if N=10 and M=9, the percentage is $$\frac{18}{(10\times 9)} = 20\%.$$

An internal connectivity threshold may be used to select clusters which are tightly coupled enough or to a sufficient or desired degree.

Figure 2C:
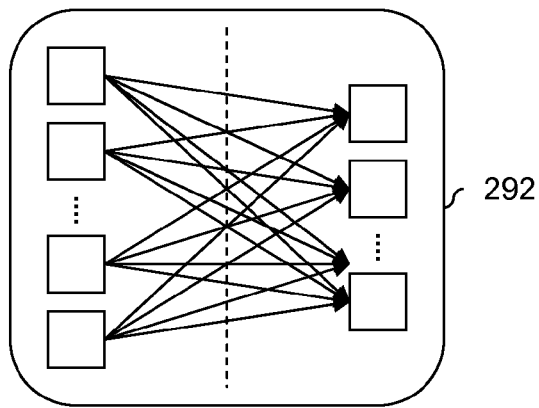
FIG. 2C is a diagram showing an embodiment of an isolated cluster which is identified as a cluster which potentially includes infected internal devices and/or malware command and control devices.
Figure 2C:
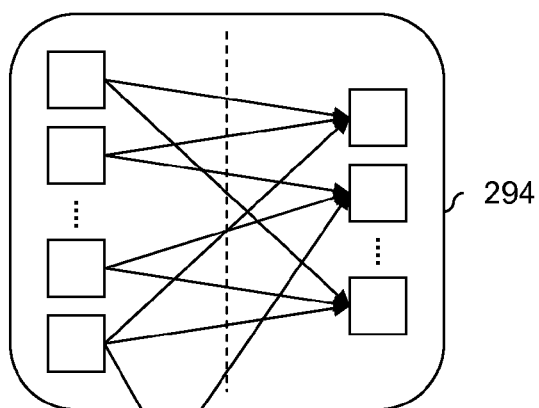
Figure 2C:
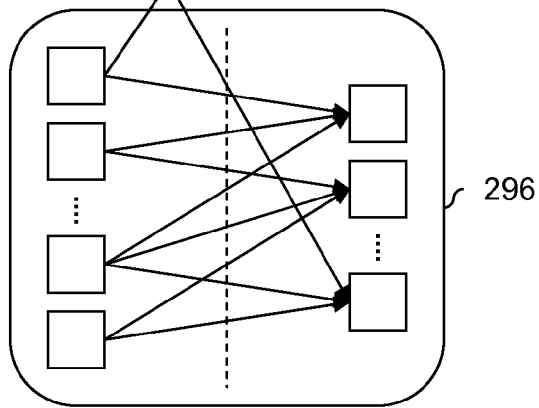

FIG. 2C is a diagram showing an embodiment of an isolated cluster which is identified as a cluster which potentially includes infected internal devices and/or malware command and control devices. Cluster 292 is merely one example of a cluster which is identified at step 104 in FIG. 1 and clusters 294 and 296 are examples of clusters which would not necessarily be identified at step 104. Clusters of infected internal devices and malware command and control devices tend to be isolated islands unto themselves, so isolated clusters are searched for using an isolation threshold. In the example shown, cluster 292 is completely or maximally isolated from clusters 294 and 296 (i.e., there is no connection between cluster 292 and the other clusters). In contrast, clusters 294 and 296 have at least one connection between them.

In this example, cluster 292 is maximally isolated from clusters 294 and 296 and thus satisfies any isolation threshold. As such, it would be selected at step 104 in FIG. 1. In one example, if connected components are used at step 104, resulting clusters selected have to be completely isolated in order to be selected at 104.

Naturally, in some embodiments an isolation threshold may be set so that a cluster which has a relatively high degree of isolation (but which is not completely isolated) would still be selected at step 104. This would enable clusters which are mostly isolated to be selected, if desired.

In some embodiments, identification at 104 is based at least in part on both a degree of isolation as well as a degree of internal connectivity. For example, cluster 202 has a high degree of internal connectivity (i.e., it is a tightly coupled cluster), which is a characteristic of clusters of infected internal devices and malware command and control devices. In contrast, clusters 294 and 296 have a relatively low degree of internal connectivity (i.e., they are more loosely coupled). In some embodiments, step 104 in FIG. 1 includes comparing an internal connectivity threshold against a cluster's degree of internal connectivity.

The following figures show the example cluster shown in FIG. 2A identified using the process of FIG. 1.

Figure 3A:
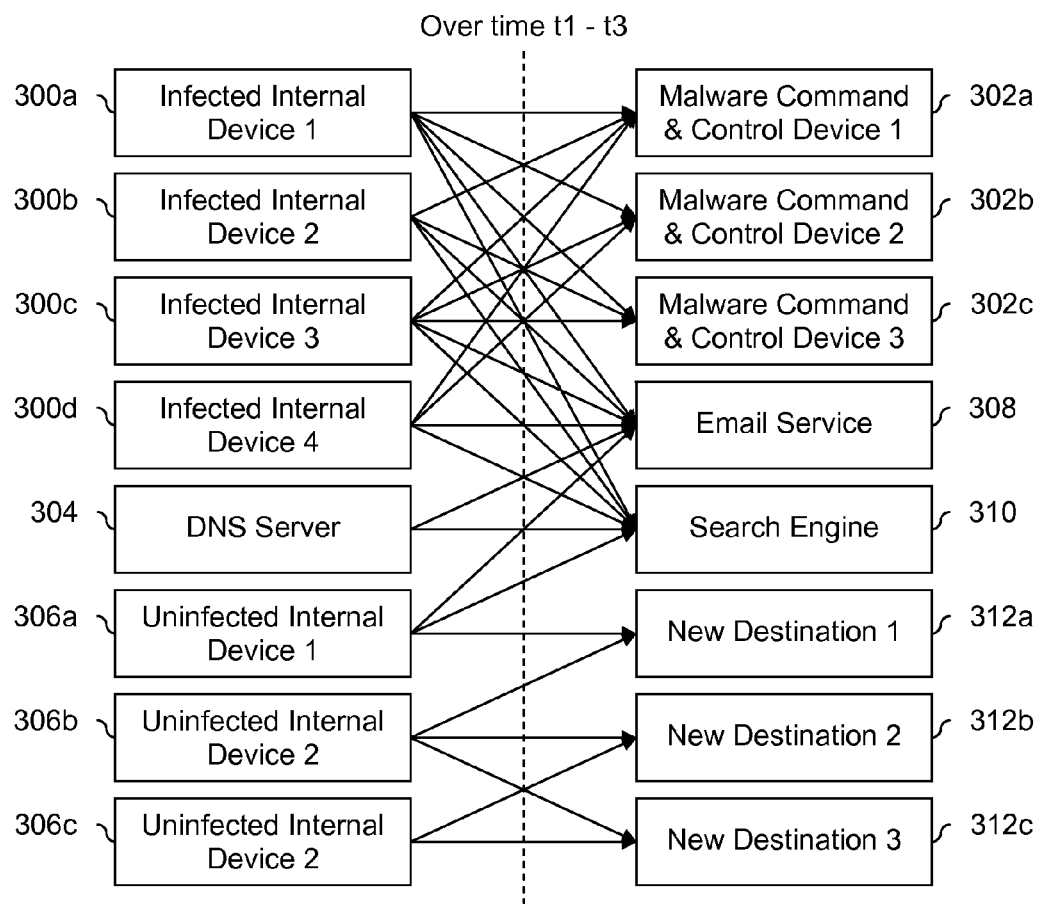
FIG. 3A is a diagram showing an embodiment of a bipartite graph.

FIG. 3A is a diagram showing an embodiment of a bipartite graph. Diagram 350 shows an example of a graph generated by step 100 in FIG. 1 and includes the cluster shown in FIG. 2A. The period of time covered by the connections in the graph shown in diagram 350 spans time t1–t3, and so the connections shown in FIG. 2A are shown.

Within the network (i.e., to the left of the dashed line) are infected internal devices 300a-300d, DNS server 304 and first, second, and third uninfected internal devices 306a-306c. Outside of the network (i.e., to the right of the dashed line) are malware command and control devices 302a-302c, email service 308, search engine 310, and first, second, and third new destinations 312a-312c. In this example, email service 308, search engine 310, and new destinations 312a-312c are harmless and are not associated with the malware command and control infrastructure.

Figure 3B:
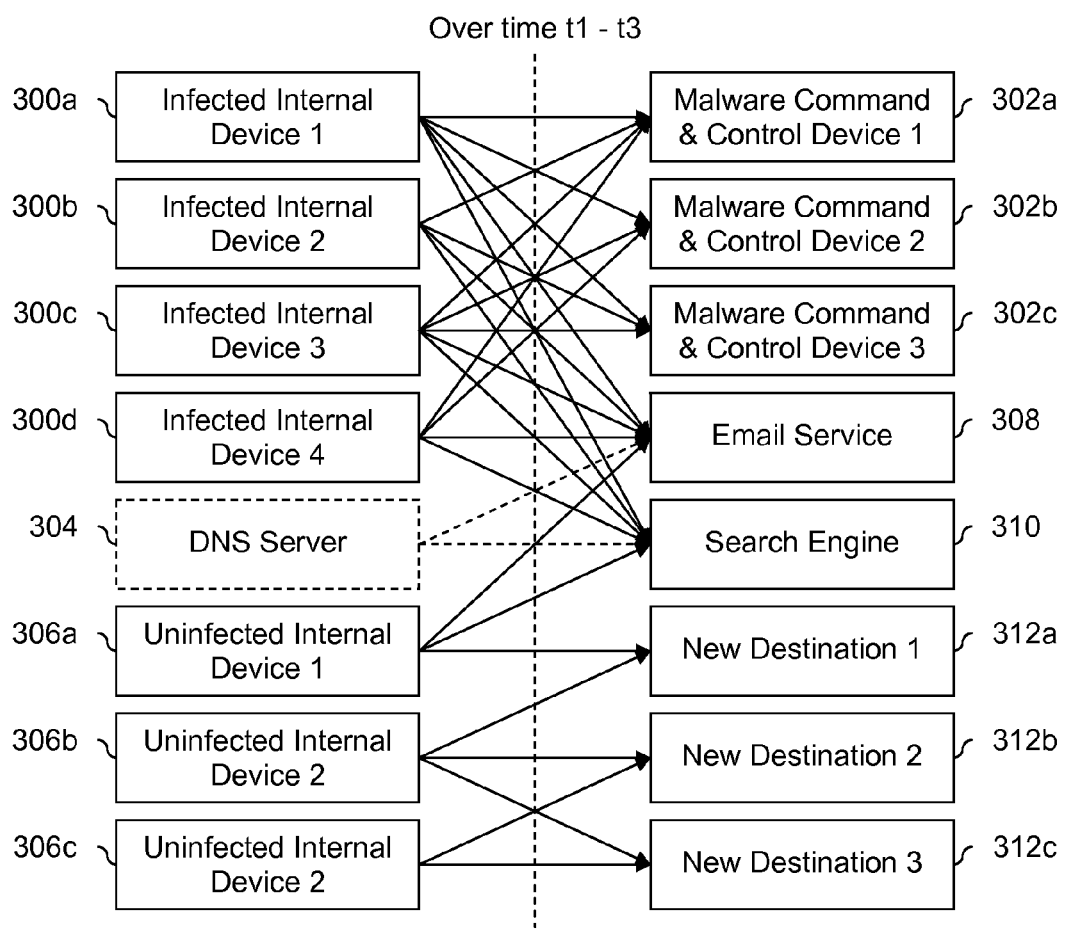
FIG. 3B is a diagram showing an embodiment of a bipartite graph after whitelisted internal devices have been eliminated.

FIG. 3B is a diagram showing an embodiment of a bipartite graph after whitelisted internal devices have been eliminated. Diagram 360 shows the graph partially through step 102 in FIG. 1. In this example, DNS server 304 is a whitelisted internal device, so any connection that includes DNS server 304 is eliminated. To reflect this, the arrow from DNS server 304 to email service 308 and the arrow from DNS server 304 to search engine 310 are shown with a dashed arrow to reflect that those connections have been eliminated.

Figure 3C:
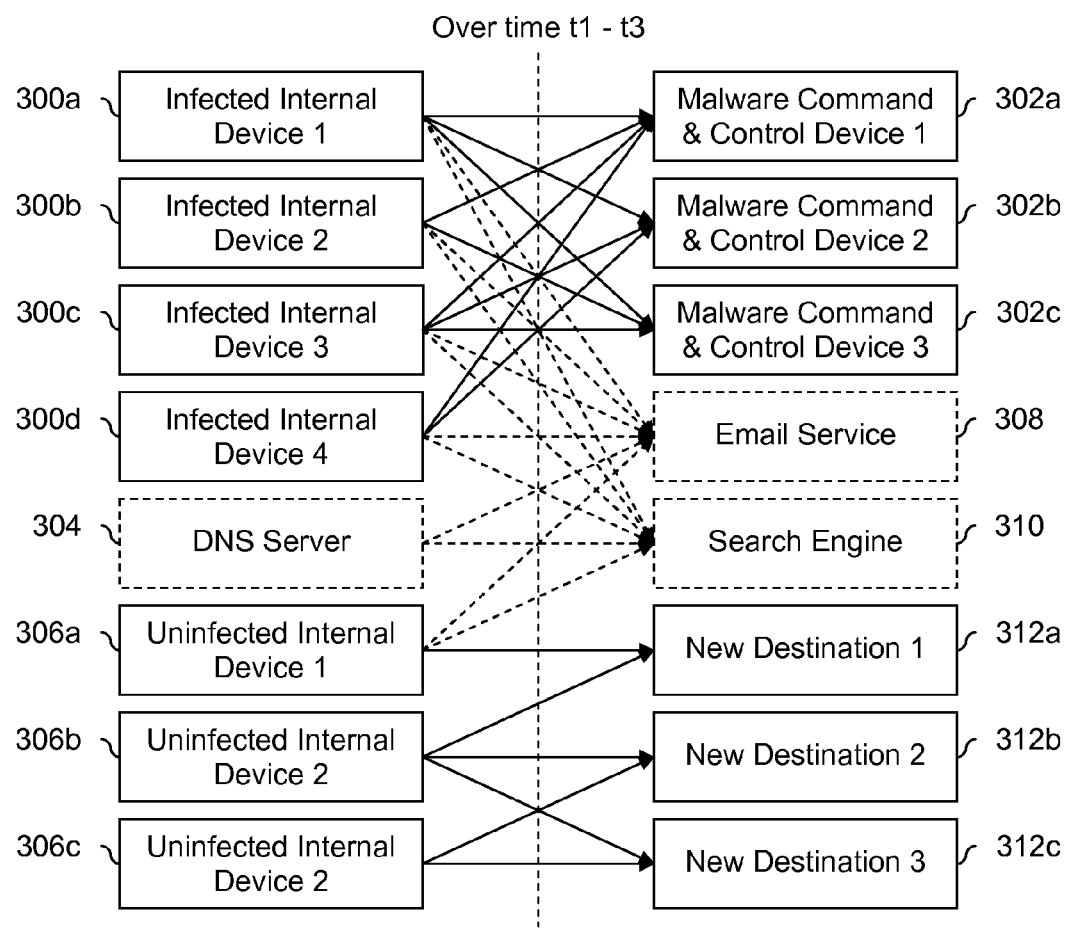
FIG. 3C is a diagram showing an embodiment of a bipartite graph after connections that include a whitelisted destination have been eliminated.

FIG. 3C is a diagram showing an embodiment of a bipartite graph after connections that include a whitelisted destination have been eliminated. In this example, email service 308 and search engine 310 are whitelisted destinations, so any connections which include email service 308 or search engine 310 are eliminated. To indicate this, the arrows from each one of infected internal devices 300a-300d to email service 308 are shown with a dashed arrow, as are each of the arrows from infected internal devices 300a-300d to search engine 310. The arrow from first uninfected internal device 306a to email service 308 and the arrow from first uninfected internal device 306a to search engine 310 are also shown with a dashed arrow since those connections are also eliminated. Diagram 370 is an example of a reduced graph after step 102 in FIG. 1.

Figure 3D:
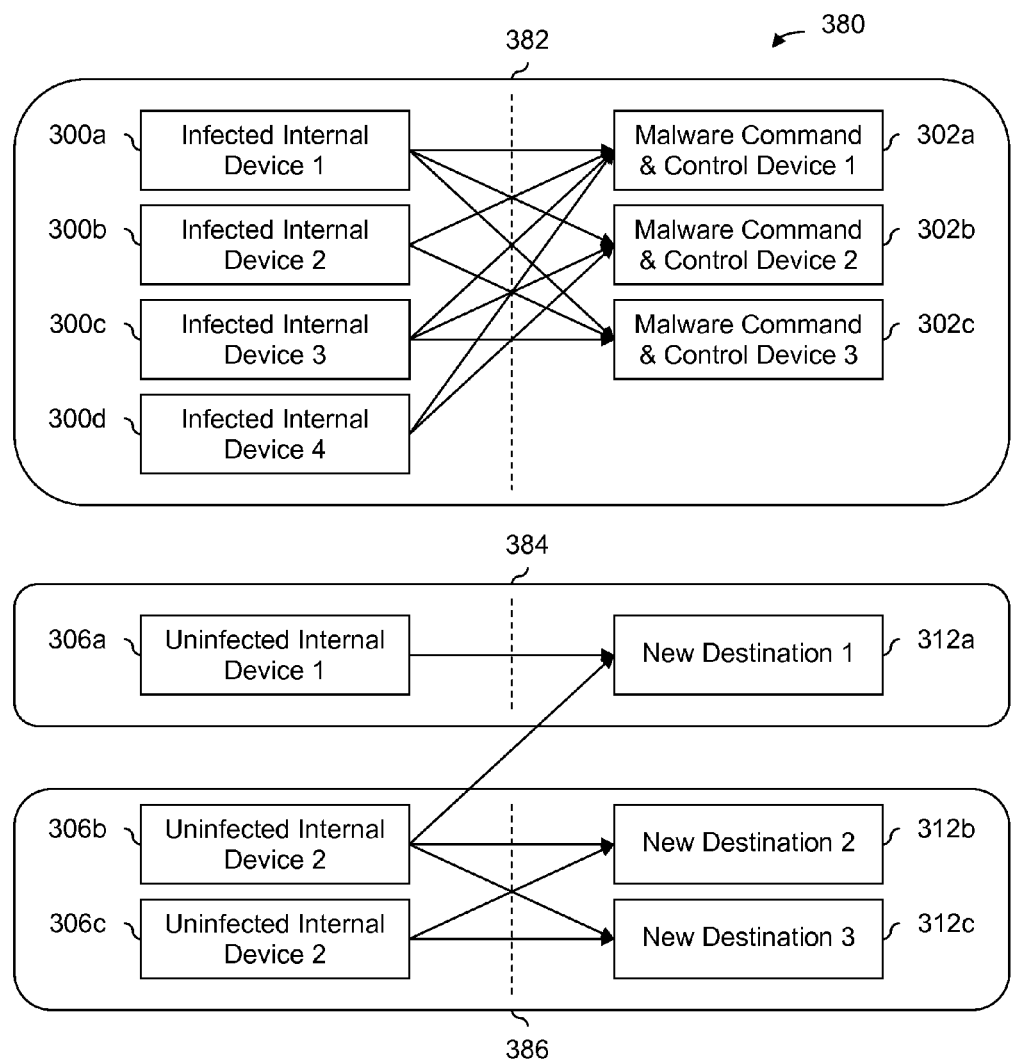
FIG. 3D is a diagram showing an embodiment of a cluster of potentially infected internal devices and potential malware command and control devices.

FIG. 3D is a diagram showing an embodiment of a cluster of potentially infected internal devices and potential malware command and control devices. In the example shown, the example malware shown in FIG. 2A is desired to be detected and other types of malware are not necessarily of interest (at least in this example). Since it is known that the malware of interest (e.g., shown in FIG. 2A) tends to appear as an isolated island after whitelisted internal devices and whitelisted destinations have been removed, each cluster's degree of isolation is compared against an isolation threshold at step 104 in FIG. 1. In this particular example, the isolation threshold is set so that only a completely isolated cluster will be identified (naturally, the isolation threshold can be set to other levels in order to identify clusters which are mostly but not completely isolated). As a result of this example isolation threshold, only cluster 382 has a sufficient degree of isolation since it is completely isolated from clusters 384 and 386. In contrast, clusters 384 and 386 have at least one connection between them, so it does not satisfy the isolation threshold (at least in this example) and would not be flagged.

Figure 4:
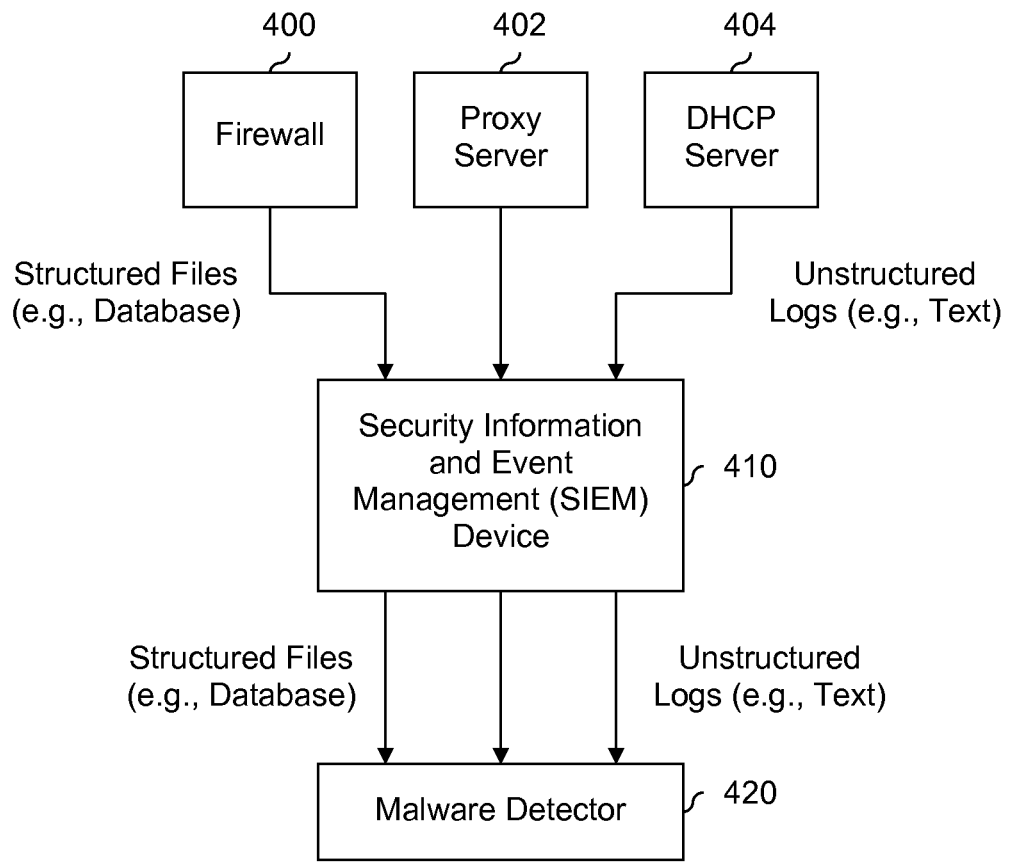
FIG. 4 is a diagram showing an embodiment of a log aggregator.

FIG. 4 is a diagram showing an embodiment of a log aggregator. In some embodiments, step 100 in FIG. 1 includes receiving information from a log aggregator in order to generate the graph. Security information and event management (SIEM) device 410 is one embodiment of a log aggregator. In the example shown, information in a variety of formats is received from a variety of devices, including structured files (such as databases) from firewall 400, data from proxy server 402, and unstructured logs (for example in text form) from dynamic host configuration protocol (DHCP) server 404. In this example, SIEM device 410 keeps the received information in its native form and so when information is passed to malware detector 420 (e.g., which performs the example process shown in FIG. 1), some of the data is received in structured form and other data is received in unstructured form. This combination of structured and unstructured data is referred to herein as semi-structured data.

One advantage to obtaining information from a log aggregator at step 100 in FIG. 1 is that existing network and/or communication devices in a system may be configured to send logs or records to a log aggregator, so it is not necessary to determine what network and/or communication devices exist in a system in order to obtain logs from each individually. Also, as new network and/or communication devices are brought online, it is expected that they will be configured to send their logs to the log aggregator. It is therefore not necessary to monitor new additions to a system.

FIG. 4 also shows that the malware detection technique described herein is able to use information from a variety of devices or sources, including devices performing the same function from different manufacturers. For example, a large corporate network may include security appliances (e.g., a firewall) from many different providers (e.g., as smaller companies with different systems are acquired). SIEM device 410 may receive logs from many different types of security providers (e.g., Palo Alto Networks, Cisco, Blue Coat, etc.). Since the relationship of devices internal to a network and destinations external to the network are made universal by the OSI model and RFC compliant protocol implementations such as TCP/IP, a set of pairs can be constructed at step 100 in FIG. 1 using information from various types of sources (e.g., a firewall versus a proxy server) and/or various manufacturers (e.g., Palo Alto Networks versus Cisco).

Naturally, some other embodiments may instead obtain raw data before it is sent to a SIEM device or other similar device. For example, some systems may choose to do so because a SIEM device introduces delay and/or is slow. Obtaining information from a SIEM device may take a non-trivial amount of time, which is not desirable if real-time data and/or a fast processing system is desired. In some cases, a SIEM device may delete or discard information desired by a malware detection device, so it is desirable to obtain raw data before it has been filtered by a SIEM device.

The following figures show an example of semi-structured data received from a log aggregator and processed to become a graph of internal devices and external devices.

FIG. 5A is a diagram showing an embodiment of semi-structured data received from a log aggregator. In diagram 550, the received data is organized in a table where the columns are internal device 500, destination 502, timestamp 504 (e.g., when the connection was initiated or requested), port number 506, amount of data exchanged 508, and duration of connection 510. A log aggregator receives data from a variety of devices and some columns are empty in some rows (e.g., because the device that recorded the event did not capture or record that particular piece of information).

First, the data outside of the range of time of interest is removed. In this example, a graph covering Apr. 15, 2013 through Apr. 19, 2013 is desired, so rows having timestamps outside of that range are eliminated. As is shown in diagram 560, this leaves only rows 520*a*-520*b* and 522.

Figure 5B:
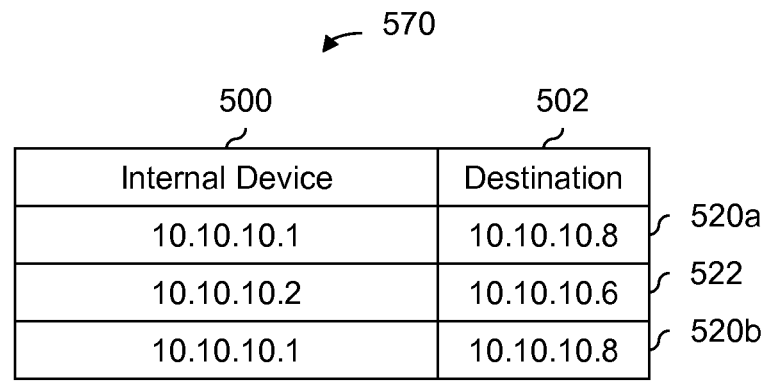
FIG. 5B is a diagram showing an embodiment of semi-structured data received from a log aggregator processed to obtain a graph.
Figure 5B:
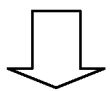
Figure 5B:
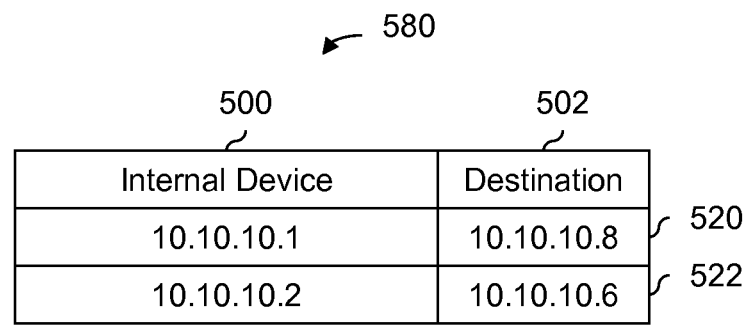

FIG. 5B is a diagram showing an embodiment of semi-structured data received from a log aggregator processed to obtain a graph. To continue the example from FIG. 5A, all columns other than internal device 500 and destination 502 are removed, resulting in the table shown in diagram 570. In this particular example, other factors (such as amount of data exchanged or duration of connection) are not considered. Alternatively, some other embodiments may keep certain columns (e.g., to use as weights, when eliminating whitelisted internal devices or whitelisted destinations at 102, and/or when identifying a cluster of potentially infected internal devices or potential malware command and control devices at 104, etc.).

Next, duplicate rows with the same internal device and same destination are eliminated (also referred to as deduplication). For example, in diagram 570, both row 520*a* and row 520*b* include the same internal device (i.e., IP address 10.10.10.1) and destination (i.e., IP address 10.10.10.8). In diagram 580, only a single row (520) remains with an internal device of 10.10.10.1 and a destination of 10.10.10.8. Diagram 580 shows one example of a graph generated at step 100 in FIG. 1 using semi-structured data from a log aggregator.

It should be noted that the processing sequence shown above is merely exemplary and any ordering of steps may be used. For example, rows outside of the time period of interest may be removed first, then duplicate rows with the same internal device and destination may be removed, and then columns not of interest may be removed.

One benefit to keeping only the internal device and destination (in embodiments where other information is not used) is that a very large amount of information has been collapsed into a much smaller amount of information. For example, the semi-structured data received from a log aggregator may comprise a total of tens of billions of rows (e.g., for structured data) plus events (e.g., for unstructured data). That amount of information may be reduced to just a few million rows with two columns. In contrast, some other malware detection techniques operate on many more rows and/or columns. This makes this malware detection technique much faster than those other malware detection techniques and enables malware remedies to be initiated that much sooner.

Also, since only the internal device and destination are included in the table in diagram 580, it does not matter if the information between an infected internal device and malware command and control infrastructure is encrypted. For example, malware detection techniques rely upon payload signature matching. In other words, those types of malware detection techniques look for certain signatures based on the payload but access to the unencrypted payload is required. A malware program simply has to encrypt its payload to make payload signature matching ineffective. In contrast, the technique described herein does not rely upon the payload and so encrypting the payload will not affect performance. Even if the payload were unencrypted, payload signature matching will not work for zero-day malware attacks since no signature for the new malware exists on the first day malware is introduced.

It should be noted that although the malware detection technique described herein is different from payload signature matching, the two may be used together and with other systems as desired. For example, graph-based malware detection may be better at detecting certain types of malware while signature-based malware detection is better at detecting other types of malware. Using a suite of malware detection programs may provide comprehensive protection.

Figure 6:
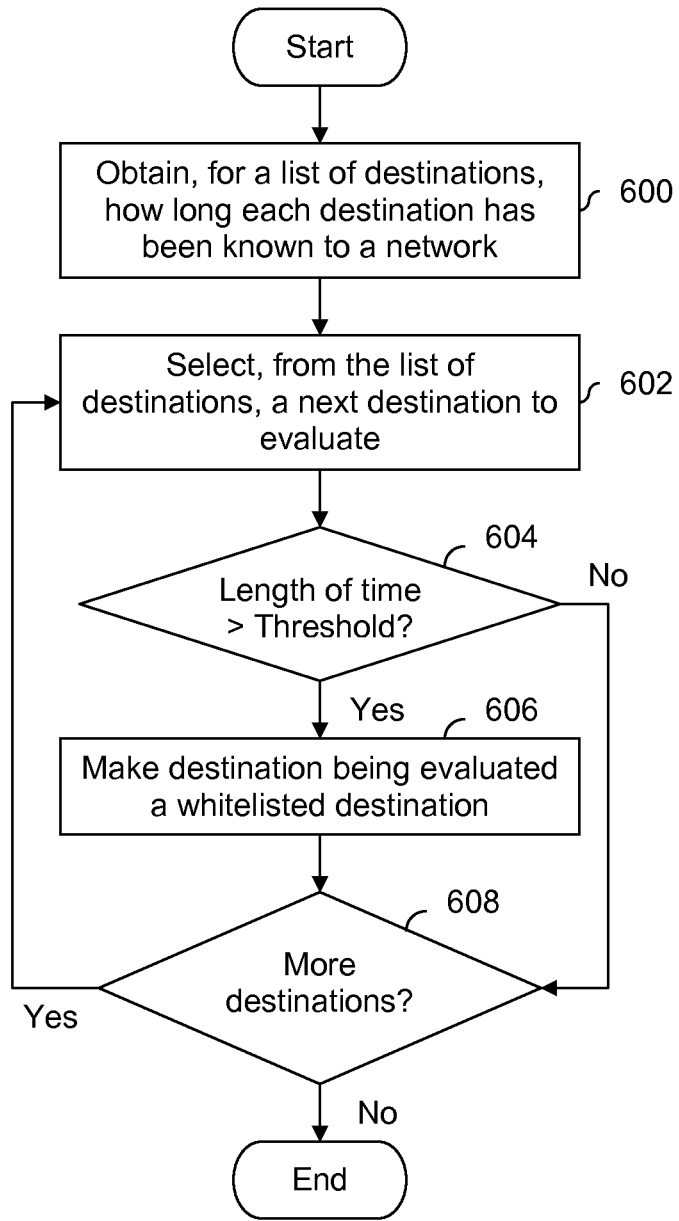
FIG. 6 is a flowchart illustrating an embodiment of a process for determining whitelisted destinations based on a length of time that a destination is known to a network.

FIG. 6 is a flowchart illustrating an embodiment of a process for determining whitelisted destinations based on a length of time that a destination is known to a network. In various embodiments, the example process shown herein is used alone or in combination with some other techniques for obtaining whitelisted destinations (e.g., to supplement a list of whitelisted destinations from an Internet reputation system).

At 600, for a list of destinations, how long each destination has been known to a network is obtained. For example, for each destination, it may be determined when that destination was first communicated with by an internal device in a (e.g., company's) network. In some embodiments, information from a log aggregator (one example of which is shown in FIG. 4) is used at step 606.

At 602, a next destination to evaluate is selected from the list of destinations. It is determined at 604 if the length of time for a destination being evaluated is greater than a threshold. For example, the threshold may be 90 days. If the length of time a destination is known to a network is greater than the threshold, the destination being evaluated is made a whitelisted destination at 606. If the length of time a destination is known to a network is less than the threshold at 604 or after making a destination a whitelisted destination at 606, it is determined if there are more destinations at 608. If so, a next destination to evaluate is selected at 602.

Figure 7:
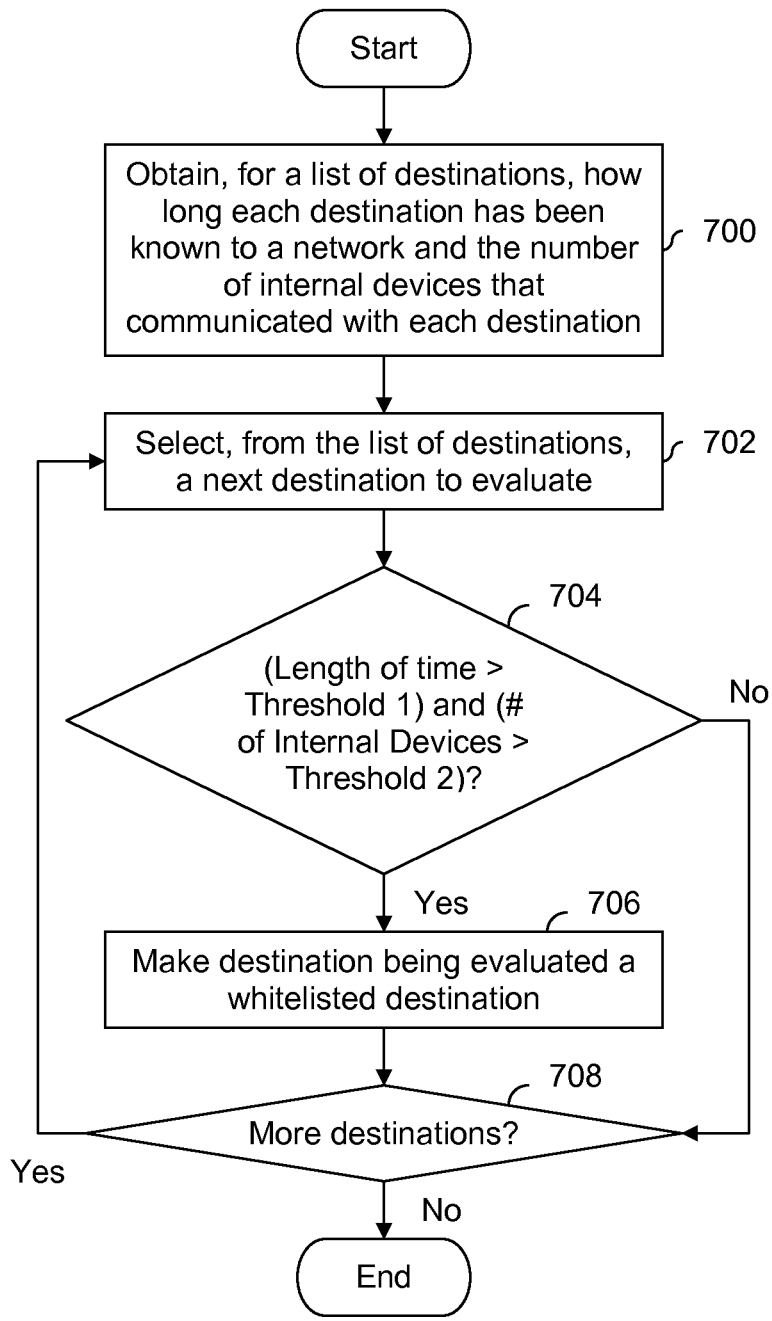
FIG. 7 is a flowchart illustrating an embodiment of a process for determining whitelisted destinations based on a length of time that a destination is known to a network and number of internal devices that communicate with that destination.

FIG. 7 is a flowchart illustrating an embodiment of a process for determining whitelisted destinations based on a length of time that a destination is known to a network and number of internal devices that communicate with that destination. As with the process shown in FIG. 6, this example process may be used alone or in combination with some other techniques for obtaining whitelisted destinations.

At 700, for a list of destinations, how long each destination has been known to a network and the number of internal devices that communicated with each destination is obtained. In some embodiments, information from a log aggregator is obtained in order to obtain the number of internal devices that communication with a destination and how long each destination has been known to a network. At 702, a next destination to evaluate is selected from the list of destinations. It is determined at 704 if the length of time each destination is known to a network is greater than a first threshold and the number of internal devices that communicated with the destination is greater than a second threshold. If so, the destination being evaluated is made a whitelisted destination at 706. For example, a destination may be made a whitelisted destination if more than 100 internal devices communicated with it and the destination has been known to the network at least 90 days. If the length of time is less than the first threshold or the number of internal devices that communicated with the destination is less than a second threshold at 704, or after making a destination a whitelisted destination at 706, it is determined if there are more destinations in the list at 708. If so, a next destination to evaluate is selected at 702.

Figure 8:
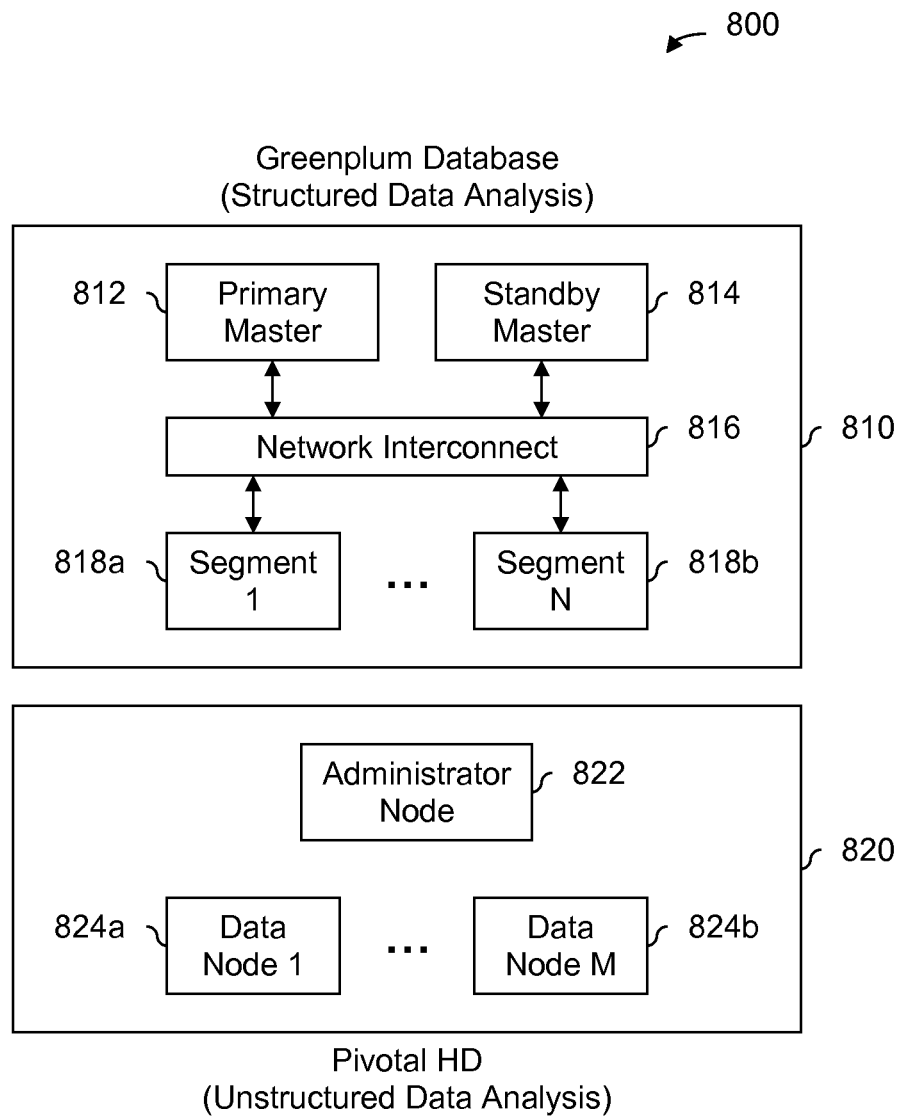
FIG. 8 is a diagram showing an embodiment of a malware detector.

FIG. 8 is a diagram showing an embodiment of a malware detector. For example, in some embodiments, malware detector 420 in FIG. 4 is implemented as shown and/or the system shown in this figure performs the process shown in FIG. 1. The system shown in this figure is exemplary and is not intended to be limiting.

Malware detector 800 includes Greenplum database 810 which performs data analysis on structured data. Greenplum database 810 is a shared-nothing, massively parallel processing (MPP) system; in some other embodiments, the malware detection technique described herein is performed on some other MPP system. Greenplum database 810 includes primary master 812, standby master 814, network interconnect 816, and N segments 818*a*-818*b*.

Malware detector 800 also includes Pivotal HD 820 which performs data analysis on unstructured data. Pivotal HD 820 is an Apache Hadoop distribution and includes administrator node 822 and M data nodes 824*a*-824*b*.

One benefit to using malware detector 800 (or a similar system) is that extract, transform, and load (ETL) processing is performed in a very short amount of time, even for the large amounts of data handled during malware detection in a typical enterprise network environment. When measured by events per second, malware detector 800 is capable of performing on the order of 50 k events per second during ETL processing, which is much better than some other systems. As described above with respect to FIGS. 5A and 5B, the amount of data imported from a log aggregator may be on the order of tens of billions of (e.g., structured) rows and/or (e.g., unstructured) events, so malware detector 800 or a similar system is desirable in order to complete malware detection in a reasonable amount of time so as to be useful.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying one or more potentially infected internal devices and one or more potential malware command and control devices, comprising:
generating a bipartite graph that includes one or more internal devices inside a protected network and one or more destinations outside the protected network which communicate over a period of time, including by receiving communication information that includes: (1) one or more internal devices, (2) one or more destinations that those internal devices communicated with, and (3) one or more times at which those internal devices communicated with those destinations;
reducing the bipartite graph to obtain a reduced bipartite graph, including by:
eliminating any communication information associated with times outside of the period of time; and
eliminating those connections that include a whitelisted internal device inside the protected network and those connections that include a whitelisted destination outside the protected network;
determining a degree of isolation representative of a degree to which a cluster, within the reduced bipartite graph and which includes one or more internal devices and one or more destinations, is isolated from one or more other clusters based at least in part on a number of connections between the cluster and said other clusters; and
using a processor to identify the cluster as being a potentially infected cluster of one or more potentially infected internal devices inside the protected network and one or more potential malware command and control devices outside the protected network in the event the cluster's degree of isolation from other clusters exceeds an isolation threshold.

2. The method of claim 1 further comprising receiving, from an Internet reputation system, reputation information for one or more destinations.

3. The method of claim 1, wherein identifying is further based at least in part on: (1) the cluster's degree of internal connectivity and (2) an internal connectivity threshold.

4. The method of claim 1, wherein generating the bipartite graph further includes obtaining structured data and unstructured data from a log aggregator.

5. The method of claim 4, wherein the log aggregator includes one or more of the following: a security information management (SIM) device, a security information and event management (SIEM) device, or a security event manager (SEM).

6. The method of claim 4, wherein the information obtained from the log aggregator includes information associated with one or more of the following: a firewall, a proxy server, or a dynamic host configuration protocol (DHCP) server.

7. The method of claim 4, wherein reducing the bipartite graph to obtain the reduced bipartite graph further includes eliminating all fields of information other than internal device and destination.

8. The method of claim 7, wherein:
generating the bipartite graph further includes:
loading the structured data from the log aggregator onto a massively parallel processing (MPP) system; and
loading the unstructured data from the log aggregator onto a Hadoop system; and reducing the bipartite graph to obtain the reduced bipartite graph further includes:
eliminating at least some of the structured data using the MPP system; and
eliminating at least some of the unstructured data using the Hadoop system.

9. A computer program product for identifying one or more potentially infected internal devices and one or more potential malware command and control devices, the computer program product being embodied in a non-transitory computer readable storage medium and comprising computer instructions for:
generating a bipartite graph that includes one or more internal devices inside a protected network and one or more destinations outside the protected network which communicate over a period of time, including by receiving communication information that includes: (1) one or more internal devices, (2) one or more destinations that those internal devices communicated with, and (3) one or more times at which those internal devices communicated with those destinations;
reducing the bipartite graph to obtain a reduced bipartite graph, including by:
eliminating any communication information associated with times outside of the period of time; and
eliminating those connections that include a whitelisted internal device inside the protected network and those connections that include a whitelisted destination outside the protected network;
determining a degree of isolation representative of a degree to which a cluster, within the reduced bipartite graph and which includes one or more internal devices and one or more destinations, is isolated from one or more other clusters based at least in part on a number of connections between the cluster and said other clusters; and
identifying the cluster as being a potentially infected cluster of one or more potentially infected internal devices inside the protected network and one or more potential malware command and control devices outside the protected network in the event the cluster's degree of isolation from other clusters exceeds an isolation threshold.

10. The computer program product of claim 9, wherein identifying is further based at least in part on: (1) the cluster's degree of internal connectivity and (2) an internal connectivity threshold.

11. The computer program product of claim 9, wherein the computer instructions for generating the bipartite graph further include computer instructions for obtaining structured data and unstructured data from a log aggregator.

12. The computer program product of claim 11, wherein the computer instructions for reducing the bipartite graph to obtain the reduced bipartite graph further include computer instructions for eliminating all fields of information other than internal device and destination.

13. The computer program product of claim 12, wherein:
the computer instructions for generating the bipartite graph further include computer instructions for:
loading the structured data from the log aggregator onto a massively parallel processing (MPP) system; and
loading the unstructured data from the log aggregator onto a Hadoop system; and
the computer instructions for reducing the bipartite graph to obtain the reduced bipartite graph further include computer instructions for:
eliminating at least some of the structured data using the MPP system; and
eliminating at least some of the unstructured data using the Hadoop system.

14. A system for identifying one or more potentially infected internal devices and one or more potential malware command and control devices, comprising:
a processor; and
a memory coupled with the processor, wherein the memory is configured to provide the processor with instructions which when executed cause the processor to:
generate a bipartite graph that includes one or more internal devices inside a protected network and one or more destinations outside the protected network which communicate over a period of time, including by receiving communication information that includes: (1) one or more internal devices, (2) one or more destinations that those internal devices communicated with, and (3) one or more times at which those internal devices communicated with those destinations;
reduce the bipartite graph to obtain a reduced bipartite graph, including by:
eliminating any communication information associated with times outside of the period of time; and
eliminating those connections that include a whitelisted internal device inside the protected network and those connections that include a whitelisted destination outside the protected network;
determine a degree of isolation representative of a degree to which a cluster, within the reduced bipartite graph and which includes one or more internal devices and one or more destinations, is isolated from one or more other clusters based at least in part on a number of connections between the cluster and said other clusters; and
identify the cluster as being a potentially infected cluster of one or more potentially infected internal devices inside the protected network and one or more potential malware command and control devices outside the protected network in the event the cluster's degree of isolation from other clusters exceeds an isolation threshold.

15. The system of claim 14, wherein the memory is further configured to provide the processor with instructions which when executed cause the processor to receive, from an Internet reputation system, reputation information for one or more destinations.

16. The system of claim 14, wherein generating the bipartite graph further includes obtaining structured data and unstructured data from a log aggregator.

17. The system of claim 16, wherein the log aggregator includes one or more of the following: a security information management (SIM) device, a security information and event management (SIEM) device, or a security event manager (SEM).

18. The system of claim 16, wherein the information obtained from the log aggregator includes information associated with one or more of the following: a firewall, a proxy server, or a dynamic host configuration protocol (DHCP) server.

19. The system of claim 16, wherein reducing the bipartite graph to obtain the reduced bipartite graph further includes eliminating all fields of information other than internal device and destination.

20. The system of claim 19, wherein:
generating the bipartite graph further includes:
loading the structured data from the log aggregator onto a massively parallel processing (MPP) system; and loading the unstructured data from the log aggregator onto a Hadoop system; and reducing the bipartite graph to obtain the reduced bipartite graph further includes:

eliminating at least some of the structured data using the MPP system; and eliminating at least some of the unstructured data using the Hadoop system.

\* \* \* \* \*